No. 711,475. Patented Oct. 21, 1902.
D. CONROY.
HORSESHOE PAD.
(Application filed Feb. 6, 1902.)
(No Model.)
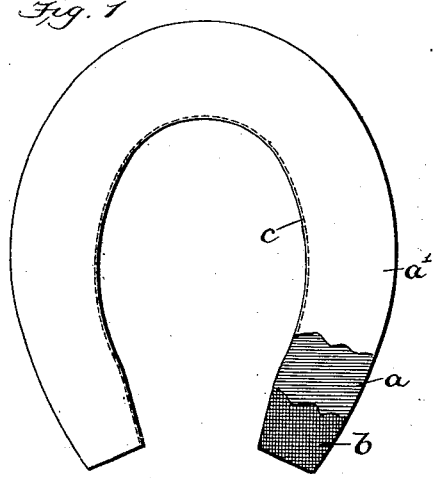
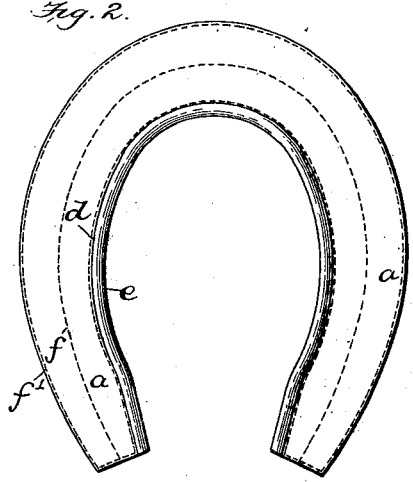
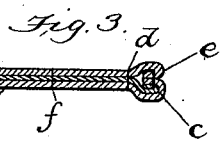
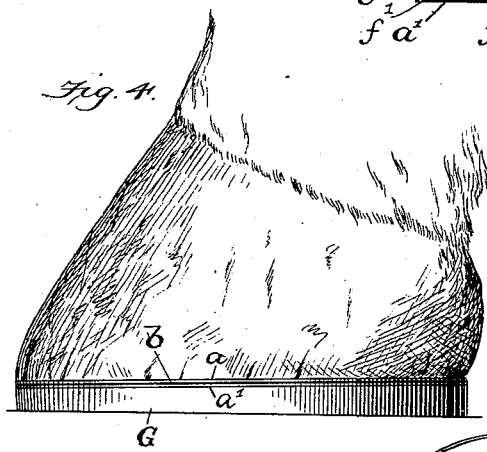
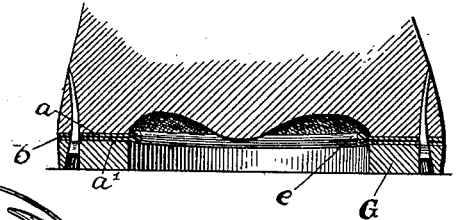
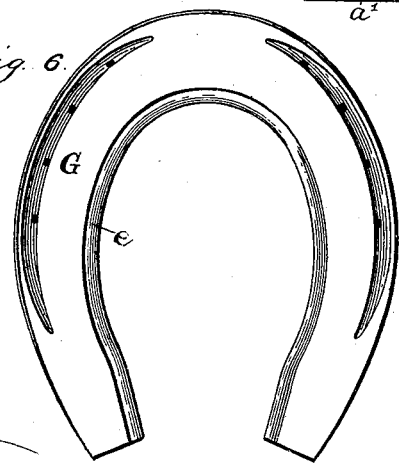
Witnesses
H. F. Meyer, Jr.
F. S. Stitt.
Inventor
Daniel Conroy
By Chas. B. Mann
Attorney
THE NORRIS PETERS CO., PHOTO-LITHO., WASHINGTON, D. C.

UNITED STATES PATENT OFFICE.

DANIEL CONROY, OF BALTIMORE, MARYLAND.

HORSESHOE-PAD.

SPECIFICATION forming part of Letters Patent No. 711,475, dated October 21, 1902.

Application filed February 6, 1902. Serial No. 92,895. (No model.)

*To all whom it may concern:*

Be it known that I, DANIEL CONROY, a citizen of the United States, residing at Baltimore, in the State of Maryland, have invented certain new and useful Improvements in Horseshoe-Pads, of which the following is a specification.

This invention relates to horseshoe-pads.

The object of the invention is to provide an improved horseshoe-pad that will have a beaded inner edge of absorbent material, which beaded edge will overlap the inner edge of the metal shoe, and thereby be exposed under the horse's hoof to absorb moisture.

The invention consists in the special construction of the pad as hereinafter set forth.

Referring to the drawings, Figure 1 is a top view showing the first stage in the manufacture of the horseshoe-pad. Fig. 2 is a plan view of the finished pad. Fig. 3 is a cross-section of the pad. Fig. 4 is a side view of a horse's hoof with the pad and shoe attached. Fig. 5 is a cross-section of the hoof, pad, and shoe. Fig. 6 is a bottom view of a horseshoe and also showing the position of the beaded edge of the pad relative to the shoe.

The pad is constructed of three plies or three thicknesses—to wit, an upper thickness or ply $a$, a lower thickness $a'$, and an interposed ply $b$ of absorbent material. In making the pad these plies are cut horseshoe shape and placed together, as in Fig. 1—that is, the bottom ply is the absorbent material $b$, and on top are the two outer plies $a\ a'$, which are to constitute the said upper and lower thicknesses, and a row of stitching $c$ around the inner edge secures all three plies together. The uppermost ply (seen in Fig. 1) is then turned on the inner edge, so as to take under the absorbent ply $b$, and thereby have the absorbent ply $b$ interposed between the other two plies $a\ a'$. After thus turning one of the plies so that the absorbent ply is held interposed between the other two plies a row of stitching $d$ is run near the inner edge, and thereby this edge is formed into a bead or enlargement $e$, as shown. This bead contains the inturned seam of the first row $c$ of stitches. The pad may then be deemed complete, though I prefer to add additional rows $ff'$ of stitches to keep the parts in firm position.

It will be seen the pad comprises an upper ply $a$, a lower ply $a'$, both of which may be made of thin leather, cloth, or other material, and an interposed ply $b$ of absorbent material, the three plies being secured together so as to form an inner beaded edge $e$ of greater thickness than the said three plies.

This improved pad is placed next the hoof, and the metal shoe G covers the main web part of the pad, but does not cover the inner beaded edge $e$. This latter edge is exposed under the hoof and is in position to be exempt from wear of the street-stones, but where it will absorb moisture which is conducted between the shoe and hoof by the interposed ply $b$. It serves to keep the hoof from becoming too dry, as well as a cushion.

Having thus described my invention, what I claim as new, and desire to secure by Letters Patent, is—

A horseshoe-pad composed of an upper and a lower ply having horseshoe shape, stitched together around the inner edge which edge is turned inward and forms a bead, and a ply, $b$, of absorbent material interposed between said upper and lower plies and secured by a row of stitches, $d$, through all the plies parallel with said inner edge, as set forth.

In testimony whereof I affix my signature in the presence of two witnesses.

DANIEL CONROY.

Witnesses:
FREDERICK S. STITT,
CHARLES L. VIETSCH.